US011831631B2

(12) United States Patent
Yehuda et al.

(10) Patent No.: US 11,831,631 B2
(45) Date of Patent: Nov. 28, 2023

(54) SINGLE SIGN-ON FOR MOBILE APPLICATIONS USING DIRECT BROKERING FOR IDENTITY AUTHENTICATION

(71) Applicant: APPDOME LTD., Tel Aviv (IL)

(72) Inventors: Avner Yehuda, Ramat Gan (IL); Tomas Tovar, San Francisco, CA (US)

(73) Assignee: APPDOME LTD., Tel Aviv (IL)

( * ) Notice: Subject to any disclaimer, the term of this patent is extended or adjusted under 35 U.S.C. 154(b) by 302 days.

(21) Appl. No.: 16/678,940

(22) Filed: Nov. 8, 2019

(65) Prior Publication Data

US 2020/0153815 A1    May 14, 2020

Related U.S. Application Data

(60) Provisional application No. 62/757,724, filed on Nov. 8, 2018.

(51) Int. Cl.
*H04L 9/40* (2022.01)
*H04L 67/562* (2022.01)
(Continued)

(52) U.S. Cl.
CPC ........ *H04L 63/0815* (2013.01); *H04L 67/146* (2013.01); *H04L 67/562* (2022.05);
(Continued)

(58) Field of Classification Search
None
See application file for complete search history.

(56) References Cited

U.S. PATENT DOCUMENTS 6,023,583 A   2/2000 Honda
7,734,689 B2  6/2010 Richer et al.
(Continued)

OTHER PUBLICATIONS

Dumais, J. "Forwarding DLLs Add Functions to Existing Software", EDN News Archive, Oct. 1, 2000 [retrieved on Dec. 11, 2021]. Retrieved from the Internet: < URL: https://www.edn.com/forwarding-dlls-add-functions-to-existing-software>. (Year: 2000).*

(Continued)

*Primary Examiner* — Kevin T Bates
*Assistant Examiner* — Dae Kim
(74) *Attorney, Agent, or Firm* — Fish & Richardson P.C.

(57) ABSTRACT

Systems, methods, devices and non-transitory, computer-readable storage mediums are disclosed for single sign-on (SSO) for mobile applications using direct brokering for identity authentication. In an embodiment, a method comprises: sending, by a mobile application operating on a mobile device, a request to an online service provider for access to a resource; receiving, by the mobile application, a redirect from the service provider to an identity service provider for authentication; and establishing, by a portion of binary code of the mobile application and using the redirect, a brokered authentication session with the identity service provider, the portion of binary code configured to operate as a broker for the mobile application for the authentication session, and to provide single sign-on (SSO) services to the mobile application and other mobile applications operating on the mobile device, the SSO services including services to access the resources and authorization to use the accessed resources.

27 Claims, 4 Drawing Sheets

(51) Int. Cl.
    *H04L 67/563*     (2022.01)
    *H04L 67/146*     (2022.01)
    *H04W 12/06*     (2021.01)
    *H04W 88/02*     (2009.01)

(52) U.S. Cl.
    CPC ......... *H04L 67/563* (2022.05); *H04W 12/068* (2021.01); *H04L 63/0892* (2013.01); *H04W 88/02* (2013.01)

(56) References Cited

U.S. PATENT DOCUMENTS

| | | | |
|---|---|---|---|
| 7,836,439 | B2 | 11/2010 | Shenfield |
| 8,522,042 | B2 | 8/2013 | Barron et al. |
| 8,984,272 | B2 | 3/2015 | Kohiyama et al. |
| 9,164,754 | B1 | 10/2015 | Pohlack |
| 9,170,784 | B1 | 10/2015 | Friedman |
| 9,177,117 | B2 | 11/2015 | Kohiyama et al. |
| 9,934,017 | B2 | 4/2018 | Yehuda et al. |
| 2002/0042833 | A1 | 4/2002 | Hendler et al. |
| 2007/0124564 | A1* | 5/2007 | Lahteenmaki .......... G06F 21/51 712/200 |
| 2008/0092129 | A1 | 4/2008 | Prakash et al. |
| 2008/0222627 | A1 | 9/2008 | Kaplan et al. |
| 2011/0131548 | A1 | 6/2011 | Colton et al. |
| 2011/0154464 | A1* | 6/2011 | Agarwal ............. H04L 63/0815 726/8 |
| 2012/0110558 | A1 | 5/2012 | Anan |
| 2012/0304160 | A1 | 11/2012 | Soeder |
| 2013/0174241 | A1* | 7/2013 | Cha .......................... H04L 63/08 726/7 |
| 2014/0026113 | A1 | 1/2014 | Farooqi |
| 2014/0059703 | A1* | 2/2014 | Hung ..................... G06F 21/54 726/28 |
| 2014/0082715 | A1* | 3/2014 | Grajek ................ H04L 63/0815 726/8 |
| 2014/0289726 | A1 | 9/2014 | Rugina et al. |
| 2014/0366015 | A1 | 12/2014 | Dobson et al. |
| 2015/0188907 | A1* | 7/2015 | Khalid ................... G06F 21/41 726/8 |
| 2015/0339137 | A1 | 11/2015 | Andrus et al. |
| 2016/0092675 | A1 | 3/2016 | Vidrine et al. |
| 2016/0103667 | A1 | 4/2016 | Chen et al. |
| 2016/0132806 | A1 | 5/2016 | Crowell et al. |
| 2016/0132808 | A1 | 5/2016 | Crowell et al. |
| 2016/0162287 | A1 | 6/2016 | Bhatia |
| 2016/0301684 | A1* | 10/2016 | He ........................ H04L 63/108 |
| 2017/0060565 | A1 | 3/2017 | Yehuda et al. |
| 2017/0097740 | A1 | 4/2017 | Kimber |
| 2017/0139696 | A1 | 5/2017 | Yehuda et al. |
| 2017/0149766 | A1* | 5/2017 | Uiterwijk ............ H04L 63/0815 |
| 2017/0177343 | A1 | 6/2017 | Lai et al. |
| 2017/0308418 | A1 | 10/2017 | Guo et al. |
| 2018/0027018 | A1* | 1/2018 | McErlane ............. H04L 63/083 713/152 |
| 2018/0121181 | A1 | 5/2018 | Seo et al. |
| 2018/0145968 | A1* | 5/2018 | Rykowski ............... G06F 21/46 |
| 2019/0114160 | A1 | 4/2019 | Yehuda et al. |
| 2019/0394187 | A1* | 12/2019 | Fletcher ............. H04L 63/0815 |
| 2020/0150933 | A1 | 5/2020 | Yehuda |

OTHER PUBLICATIONS

Elenkov, Nikolay. "How to securely store access toekn and secret in Android?", Stackoverflow website, Apr. 15, 2012 [retrieved on Aug. 12, 2023]. Retrieved from the Internet: <URL: https://stackoverflow.com/questions/10161266/how-to-securely-store-access-token-and-secret-in-android>. (Year: 2012).*

International Preliminary Report on Patentability in International Appln. No. PCT/US2019/060632, dated May 20, 2021, 10 pages.

Chernoff et al., "FX! 32: A profile-directed binary translator." In: IEEE Micro 2. Mar. 1998 (Mar. 1998) Retrieved from <ftp://ftp.cis.upenn.edu/pub/cis700-6/public_html/04f/papers/chernoff-fx32.pdf> entire document.

International Search Report and Written Opinion of the International Searching Authority, International Application No. PCT/US2018/056359, dated Jan. 3, 2019, 11 pages.

Tallent, et al., "Binary analysis for measurement and attribution of program performance," ACM SIGPLAN Notices, 2009, 44(6):441-452.

U.S. Appl. No. 16/678,907, filed Nov. 8, 2019, Yehuda.

* cited by examiner

SINGLE SIGN-ON FOR MOBILE APPLICATIONS USING DIRECT BROKERING FOR IDENTITY AUTHENTICATION

CROSS-REFERENCE TO RELATED APPLICATION

This application claims priority to U.S. Provisional Patent Application No. 62/757,724, filed Nov. 8, 2018, the entire contents of which is incorporated herein by reference.

TECHNICAL FIELD

This disclosure relates generally to single sign-on (SSO) mechanisms for mobile applications.

BACKGROUND

When using various services available on the World Wide Web ("web services"), a user is typically required to log-in to the web service and be authenticated. For example, when the user's browser sends a request to a web service for access, the browser is redirected to an authentication page, where the user enters their log-in credentials, such as a user ID and a password. The user then receives a success or failure message from the web server. If the user desires to access multiple web services, the user is required to go through multiple log-in and authentication mechanisms with multiple web servers, each of which can use different steps and require different information to authenticate the user.

SSO allows a user to log in with single user ID and password to gain access to a connected system or systems without using different usernames or passwords. Security Assertion Markup Language (SAML) is a standard protocol for web browser SSO that uses an XML-based, open-standard data format for exchanging authentication and authorization data between an ID provider and a web service provider. In some embodiments, a web service may delegate authentication to a third-party identity (ID) provider (e.g., Okta®). The web service redirects access requests it receives to the ID provider for authentication rather than performing authentication on its own web servers.

OAuth™ is an open standard for access delegation that allows users to grant websites or applications access to their information on other websites but without sharing their credentials. OAuth works with Hypertext Transfer Protocol (HTTP) to allow access tokens to be issued to third-party clients by an authorization server with the approval of the resource owner. The third party uses the access token to access protected resources hosted by the resource owner. The industry has standardize access to resources using web distributed authoring and versioning (WebDAV) protocol. WebDAV allows clients to perform remote web content authoring operations, and provides a framework for users to create, change and move documents on a web server.

The solutions described above work well for web browser SSO but are not sufficient for mobile application SSO. Mobile applications or "apps" are typically isolated on the host mobile device (e.g., smartphone, smartwatch, tablet computer) and do not use a separate browser application to access web services. Accordingly mobile applications are forced to trust the web pages that the mobile applications are redirected to by a web service for authentication. This allows an application to be redirected to a malicious website that can be used to obtain the user's personal information. Additionally, the user's credentials (user ID, password) are typically stored unencrypted in a shared folder of the mobile application where the credentials can be discovered by malicious code and transferred out of the mobile device.

SUMMARY

Systems, methods, devices and non-transitory, computer-readable storage mediums are disclosed for single sign-on for mobile applications using direct brokering for identity authentication.

In an embodiment, a method comprises: sending, by a mobile application operating on a mobile device, a request to an online service provider for access to a resource; receiving, by the mobile application, a redirect from the service provider to an identity service provider for authentication; and establishing, by a portion of binary code of the mobile application and using the redirect, a brokered authentication session with the identity service provider, the portion of binary code configured to operate as a broker for the mobile application for the authentication session, and to provide single sign-on (SSO) services to the mobile application and other mobile applications operating on the mobile device, the SSO services including services to access the resources and authorization to use the accessed resources.

Other embodiments are directed to methods, systems, apparatuses and non-transitory, computer-readable storage mediums.

Particular embodiments disclosed herein provide one or more of the following advantages. The disclosed embodiments allow fusing of software to mobile applications that provides access, authentication and authorization (AAA) for web services. The redirecting of mobile applications to ID providers for authentication are no longer at risk of attack. The user's credentials are stored encrypted on the mobile device. Each application is aware of other sessions of other mobile applications on the mobile device to allow sharing of information across mobile applications.

The details of the disclosed implementations are set forth in the accompanying drawings and the description below. Other features, objects and advantages are apparent from the description, drawings and claims.

DESCRIPTION OF DRAWINGS

The same reference symbol used in various drawings indicates like elements.

DETAILED DESCRIPTION

Overview of App Fusion Platform (AFP)

Figure 1:
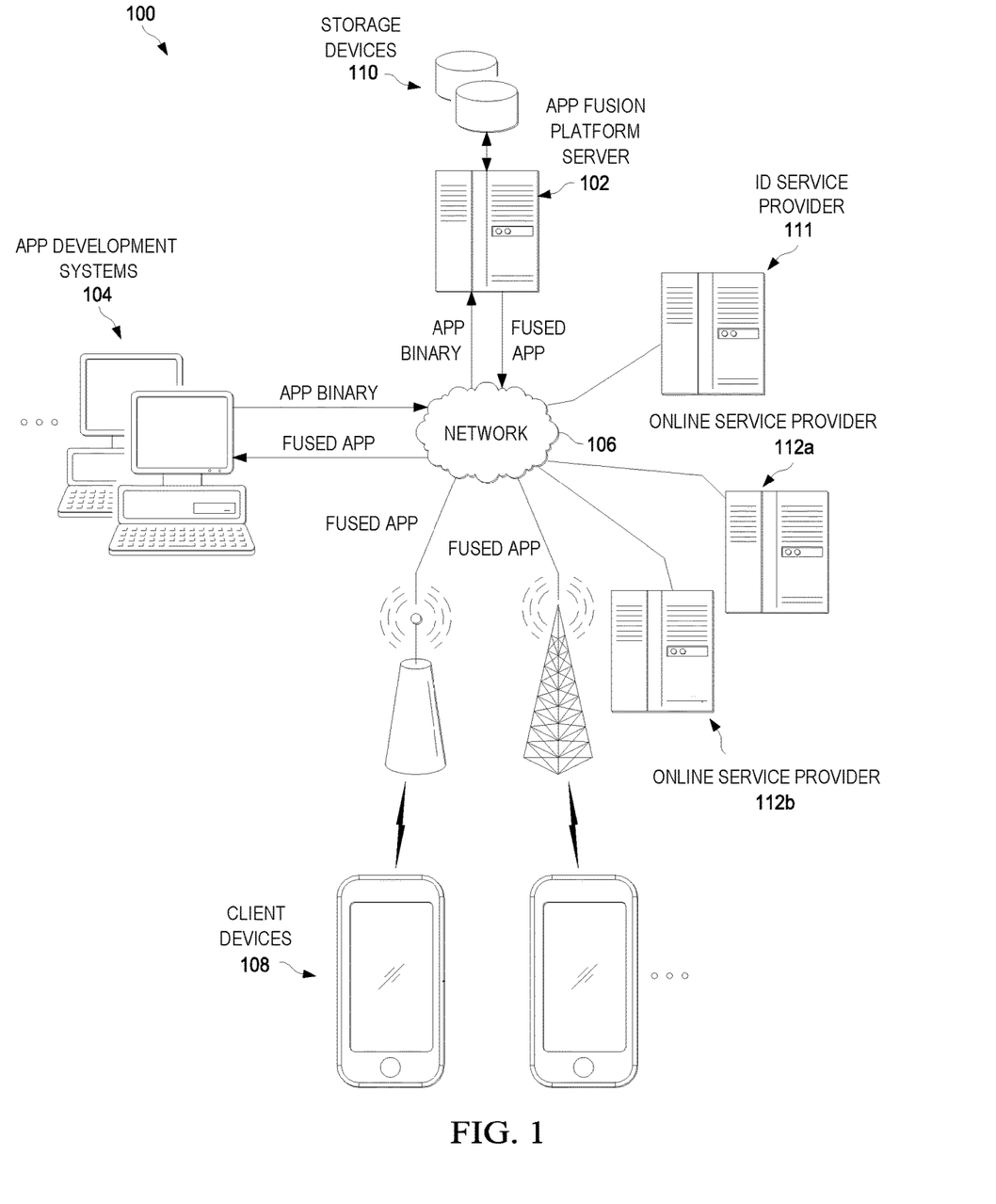
FIG. 1 is a block diagram of a computing environment that includes an application fusion platform (AFP), according to an embodiment.

FIG. 1 is a block diagram of a computing environment 100 that includes the AFP, according to an embodiment. Computing environment 100 includes AFP servers 102, app development systems 104, network 106 (e.g., the Internet), client devices 108, ID service provider 111 and online service providers 112*a*, 112*b* (e.g., Web service providers). AFP servers 102 are coupled to storage devices 110. Client devices 108 include any mobile device that can run a software app, including but not limited to: smartphones, tablet computers, wearable devices and Internet of Things (IoT) devices. App development systems 104 include any computers or devices that are capable of uploading and downloading binary files from AFP servers 102 through network 106, and that include input/output devices that allow the user to interact with the AFP.

AFP servers 102 implement the AFP in "the cloud" as a system as a service (SaaS). The SaaS automates the mobile app integration process by enabling mobile developers and mobility professionals to integrate services such as mobile security or implement full SDKs (or portions of SDKs) with new or existing mobile apps using only the app binary. The process is fast and simple and does not require source code access, and eliminates the need for development cycles and ongoing software maintenance.

AFP servers 102 include a web server that provides web pages with GUIs that allow users to interact with the AFP by providing an intuitive workflow for uploading, fusing, signing, deploying and analyzing fused apps. After the user selects the mobile apps/services/SDKs (hereinafter also referred to collectively as "services") that the user would like to integrate ("fuse") with their app binary, the services are fused with the app binary, producing a new app binary, hereinafter also referred to as a "fused app." The fused-in services co-exist inside the same app and provide better feature set granularity and choice. In an embodiment, run time decisions can be made by the user to enable or disable certain capabilities based on organizational policy so that unneeded features are not running and thus are not consuming system resources.

In an embodiment, the AFP includes an app library that enables users to upload and store an unlimited number of mobile apps in a stateful repository (e.g., storage devices 110) and make them available for integration to any number of services, as described in further detail below.

In an embodiment, the AFP includes a fusion workbench that allows users to select the preferred mobile services to fuse to a particular app and creates datasets referred to as "fusion sets" (saved combinations of fusion settings unique to each user) to apply to apps.

In an embodiment, the AFP includes an app publisher service that allows users to access commercial app binaries (e.g., ISV apps) and commercial SDKs (e.g., BlackBerry® Dynamics EMM SDK, Appaloosa® MAM SDK). The AFP also has mobile security features that can be selected and fused with any app.

In an embodiment, the AFP can fuse AAA code to mobile applications that provide authentication with ID service provider 111 and other SSO services for web service providers 112a, 112b, as described below in reference to FIGS. 2 and 3. In another embodiment, SSO services can be added manually to an application without the fusion process described above.

Example SSO System

Figure 2:
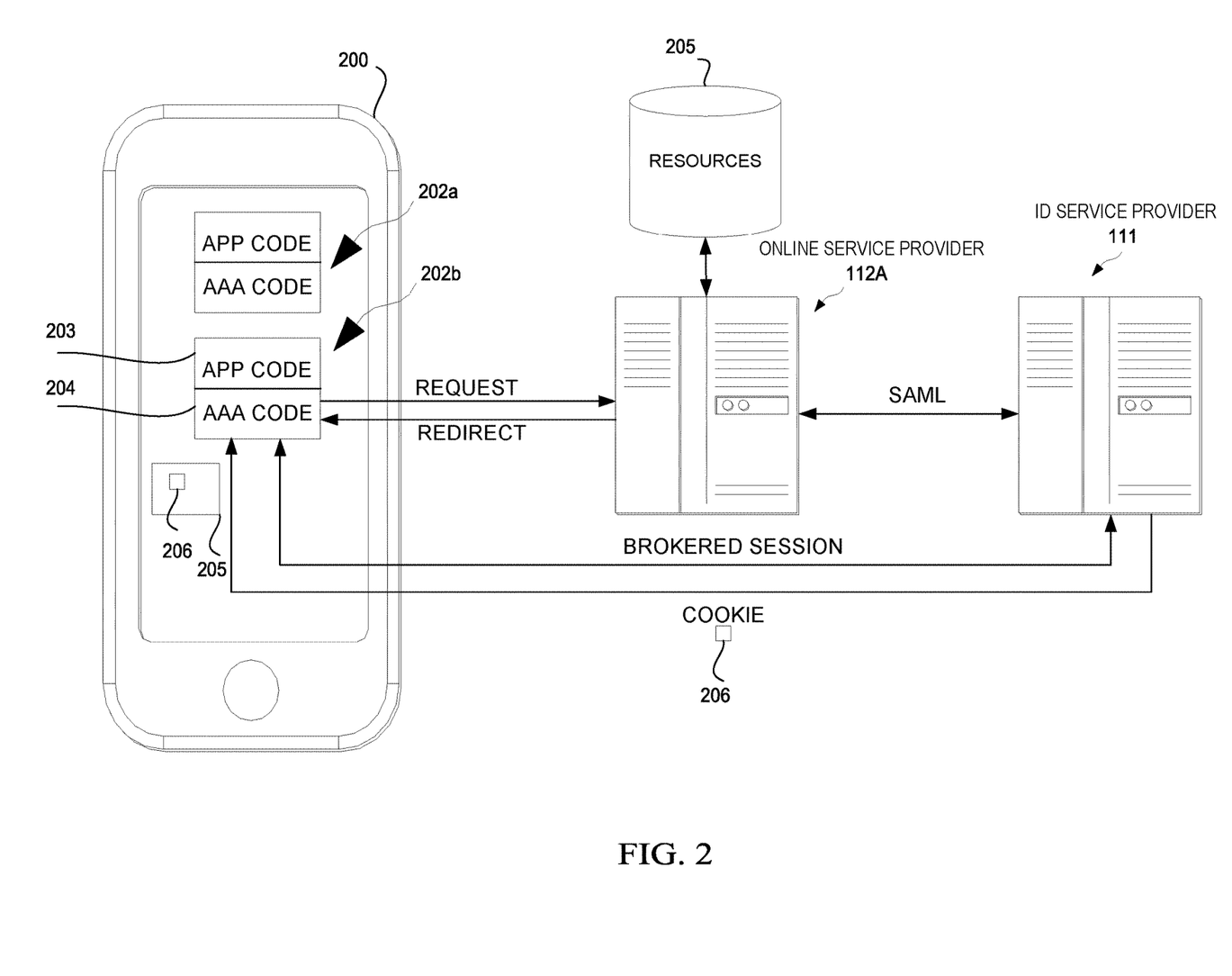
FIG. 2 is a block diagram illustrating mobile application SSO, according to an embodiment.

FIG. 2 is a block diagram illustrating mobile application SSO, according to an embodiment. Mobile device 200 includes binaries 202a, 202b for two different mobile applications. Each binary 202a, 202b includes app code 203 and AAA code 204 for facilitating access, authentication and authorization for web services. In this example embodiment, AAA code 204 is fused into binary app code 203 using the process described in reference to FIG. 1. Alternatively, AAA code 204 is manually added to app code 203 or otherwise combined with app code 203 (e.g., a dynamic link library, patch, plugin, code extension).

In the example shown, AAA code 204 sends a request to online service provider 112a for access to resources 205. As used herein the term "online service provider" means a provider of online services or network access, or the operator of facilities therefore, and includes but is not limited to: Web service providers, Internet service provider, email provider, news provider, entertainment provider (e.g., music, movies), search engine, e-commerce site, online banking site, healthcare site, official government site, social media, a wiki or a Usenet newsgroup. Online service provider 112a sends a response to AAA code 204 that includes a redirect, such as uniform resource locater (URL) to a server of ID provider 111, or a standard response code indicating an authentication scheme and requirements. An ID service provider (IdP) is a system entity that creates, maintains, and manages identity information for principals while providing authentication services to relying party applications within a federation or distributed network. In this example, ID service provider 111 performs delegated authentication services for online service provider 112a. AAA code 204 uses the redirect URL to establish a session with ID service provider 111 for an authentication session. ID service provider 111 sends a response to AAA code 204 that includes a session cookie 206, which is stored in a closed (sandboxed) memory location 205 of mobile device 200 (or external to mobile device 200, such as an SDCard®, external hard disk or flash drive, network storage device, etc.). AAA code 204 then operates as a broker between app code 203 and ID service provider 111 in an authentication session with ID service provider 111. A "sandbox" is a security mechanism for separating running programs to mitigate system failures or software vulnerabilities from spreading. The "sandbox" provides a tightly controlled set of resources for guest or non-native programs to run in, such as scratch space in flash memory.

The session cookie provided by ID provider 111 is encrypted and stored on mobile device 200. Session cookies associated with different mobile apps using web services are segmented on mobile device 200, such that each mobile app has its own session cookie. Each AAA code 204 fused to each app code 203 is configured to communicate with other AAA code 204 fused with other mobile apps on mobile device 200. The AAA codes are configured to communicate with each other, thus allowing each mobile app to be aware of other concurrent web service sessions engaged by other mobile apps on mobile device 200. In an embodiment, encrypted cookies 206 are shared among apps fused with AAA codes 204 using any shared memory space available on mobile device 200, including but not limited to: an SDCard®, a storage location on/off mobile device 200, inter-process communication (IPC) and a remote storage space accessible over the Web. IPC includes mechanisms that an operating system (e.g., iOS Android®) on mobile device 200 provides to allow processes (e.g., processes spawned by AAC codes fused to app codes) running on mobile device 200 to manage shared data.

As referenced above, AAA code 204 operates as a broker with web services and ID service providers. AAA code 204 includes all the necessary code to perform standardized SSO services with the web services and ID service providers, including but not limited to: authentication, access and authorization services. In an embodiment, AAA code 204 operates as a direct broker as follows: Step 1: AAA code 204 receives from app code 203 a service enquiry message in the form of a set of attributes that characterize a desired web service. Step 2: if AAA code 204 determines that a matching server is available, AAA code 204 sends back to app code 203 a name and address of the matching server; otherwise, it sends a failure response to app code 203. Step 3: app code 203 sends a server operation request directly to the matching server. Step 4: the matching server sends back a response to the server operation request. In the foregoing example session, only service enquiry messages are sent from AAA code 204 to the matching server. The mobile application is not redirected to some unknown or untrusted server like in conventional SSO. Rather, the mobile application is shielded by AAA code 204 that brokers the authentication, access and authorization services on behalf of the mobile application.

In another embodiment, AAA 204 code operates as a forward broker. An example session is as follows: Step 1: AAA code 204 receives from app code 203 a service enquiry message in the form of a set of attributes that characterizes a desired web service and a server operation request. Step 2: if AAA code 204 determines that a matching server is available, AAA 204 code sends the server operation request to the matching server; otherwise, it sends a failure response to app code 203. Step 3: the matching server sends back a response to AAA code 204. Step 4: AAA code 204 passes the response to app code 203. In this embodiment, all requests to the matching server, and all responses from the matching server, go through AAA code 204.

Example Processes

Figure 3:
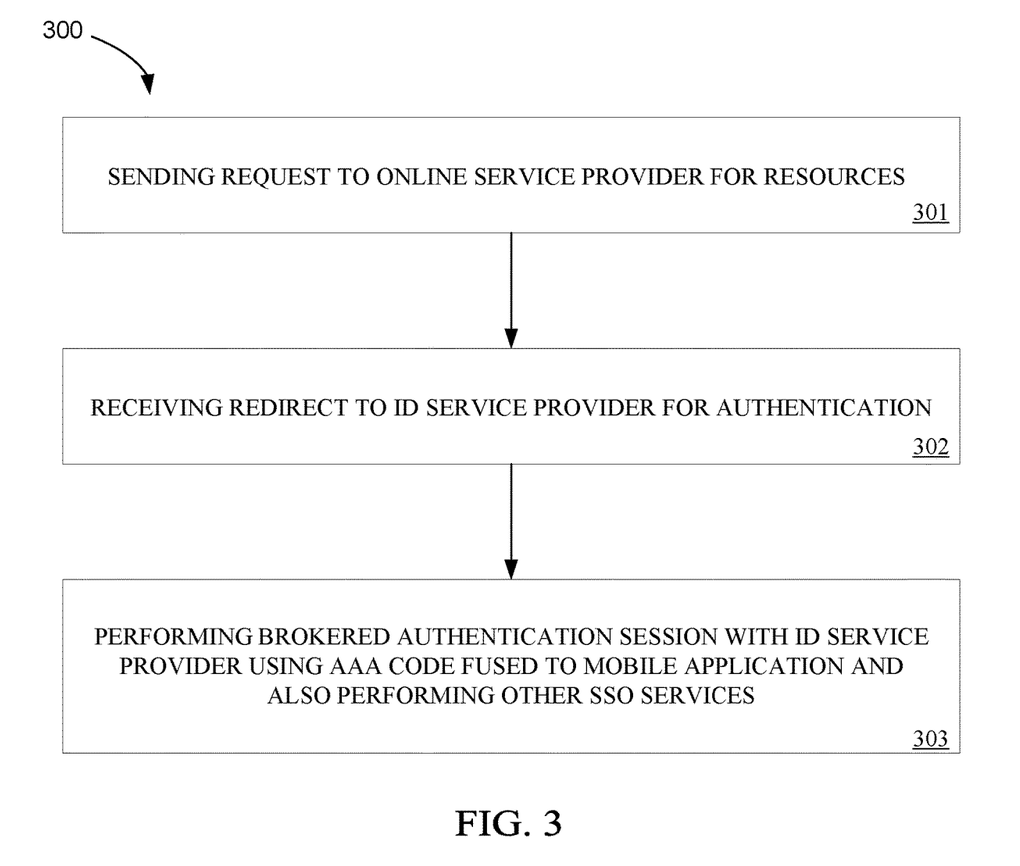
FIG. 3 is a flow diagram for a SSO process, according to an application.

FIG. 3 is a flow diagram for a SSO process, according to an application. Process 300 can be implemented using the architecture 400 described in reference to FIG. 4

In an embodiment, process 300 begins by a mobile application operating on a mobile device sending a request to an online service provider (301), and then receiving a redirect from the web service provider to an ID service provider for an authentication session (302). Process 300 continues by establishing, by a portion of binary code (e.g., AAA code) of the mobile application and the redirect, a brokered authentication session with the ID service provider (303), as described in reference to FIG. 2. The portion of binary code is configured to operate as a direct or forward broker for the mobile application in the authentication session. The portion of binary code is also configured to provide additional SSO services to the mobile application and other mobile applications operating on the mobile device, such as access to resources of web service providers and authorization to use the resources without further authentication.

Sharing Transaction Data Using Shared Space

Mobile applications can be single domain mobile applications or multi-domain mobile applications. Conventional multi-domain mobile applications can share unencrypted session transaction data (e.g., credentials, cookies) across domains. For example, a multi-domain mobile application can engage in two or more authenticated communication sessions with different server computers (e.g., different websites), and each session can access the unencrypted transaction data (e.g., credentials, cookies) of the other sessions through a shared folder that stores the transaction data for all the sessions.

The sharing of transaction data (e.g., credentials, cookies) across domains, can cause security problems for mobile applications. For example, malware downloaded onto the mobile device in one session can steal transaction data (e.g., passwords, session keys) from another session and use that data for nefarious purposes. These security problems are exacerbated on mobile devices with multiple mobile applications running, where each mobile application can access the unencrypted transaction data of every other application on the mobile device through the unsecured shared folder on the mobile device.

To address this security threat, in an embodiment the AAA code previously described segments the domains, so that transaction data cannot be shared across domains, thus improving the security of the multi-domain mobile application. In addition, the AAA code allows transaction data (e.g. credentials, cookies) to be shared between two or more apps on the same mobile device operating in the same domain, using a secured, shared space allocated in memory of the mobile device. The transaction data for the session is encrypted (e.g., using in memory encryption) and stored in the shared space. Only apps operating in the same domain are allowed access to unencrypted transaction data (e.g., using in memory decryption) stored in the shared space. Accordingly, if malware tries to access the shared space, the malware will only get encrypted data.

Example Mobile Device Architecture

Figure 4:
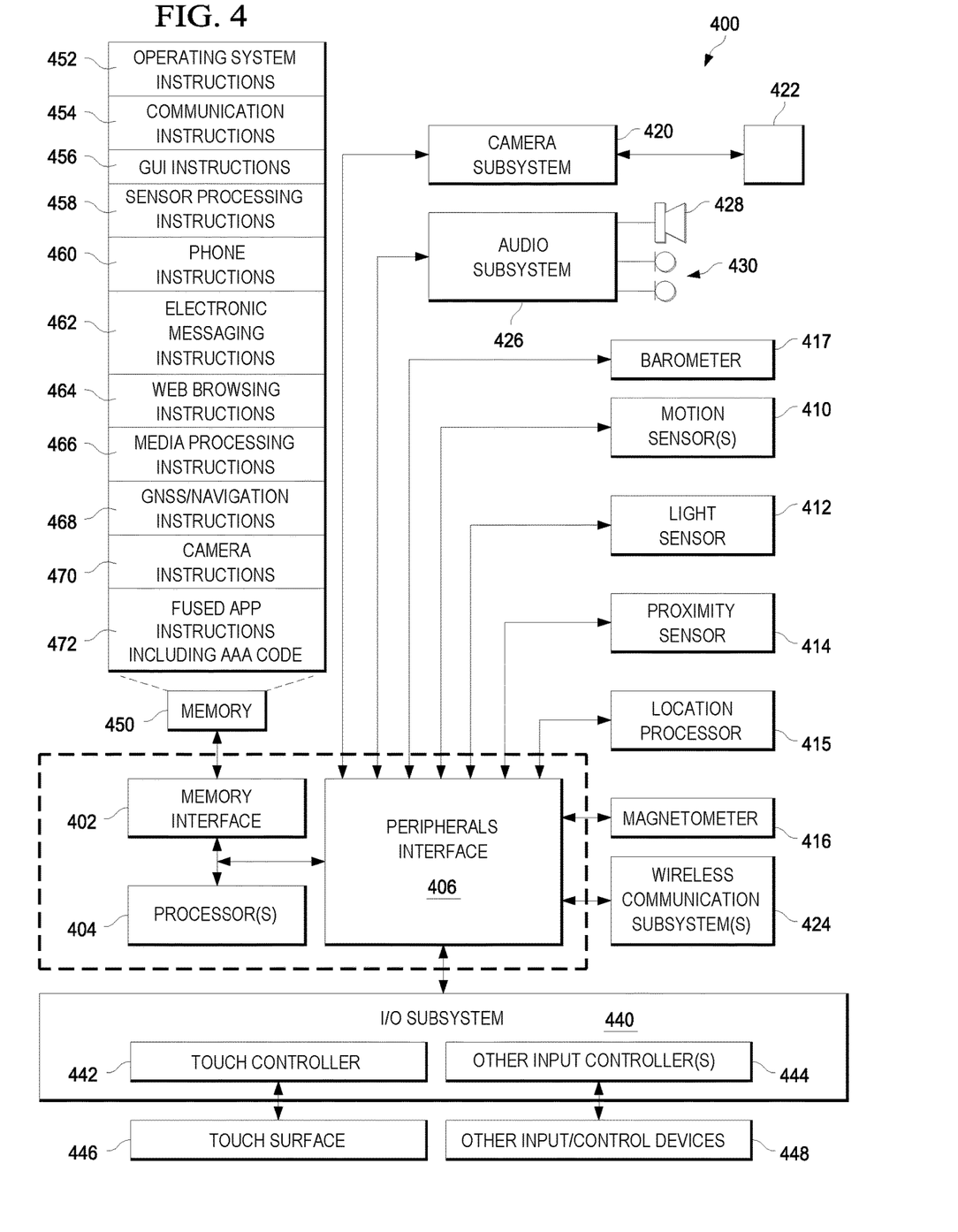
FIG. 4 is mobile device architecture, according to an embodiment.

FIG. 4 is a block diagram of example mobile device architecture 400 for implementing the features and processes described in reference to FIGS. 1-3. Architecture 400 may be implemented in any electronic device for generating the features and processes described in reference to FIGS. 1-3, including but not limited to smart phones, tablet computers, wearable computers and IoT devices (e.g., smart watches, fitness bands). Architecture 400 may include memory interface 402, data processor(s), image processor(s) or central processing unit(s) 404, and peripherals interface 406. Memory interface 402, processor(s) 404 or peripherals interface 406 may be separate components or may be integrated in one or more integrated circuits. One or more communication buses or signal lines may couple the various components.

Sensors, devices, and subsystems may be coupled to peripherals interface 406 to facilitate multiple functionalities. For example, motion sensor(s) 410, light sensor 412, and proximity sensor 414 may be coupled to peripherals interface 406 to facilitate orientation, lighting, and proximity functions of the mobile device. For example, in some implementations, light sensor 412 may be utilized to facilitate adjusting the brightness of touch surface 446. In some implementations, motion sensor(s) 410 (e.g., an accelerometer, rate gyroscope) may be utilized to detect movement and orientation of the device. Accordingly, display objects or media may be presented according to a detected orientation (e.g., portrait or landscape).

Other sensors may also be connected to peripherals interface 406, such as a temperature sensor, a barometer, a biometric sensor or other sensing device, to facilitate related functionalities. For example, a biometric sensor can detect fingerprints and monitor heart rate and other fitness parameters. In an embodiment, a haptic motor (not shown) can be coupled to the peripheral interface, which can provide vibration patterns as haptic feedback.

Location processor 415 (e.g., GNSS receiver chip) may be connected to peripherals interface 406 to provide geo-referencing. Electronic magnetometer 416 (e.g., an integrated circuit chip) may also be connected to peripherals interface 406 to provide data that may be used to determine the direction of magnetic North. Thus, electronic magnetometer 416 may be used as an electronic compass.

Camera subsystem 420 and an optical sensor 422, e.g., a charged coupled device (CCD) or a complementary metal-oxide semiconductor (CMOS) optical sensor, may be utilized to facilitate camera functions, such as recording photographs and video clips.

Communication functions may be facilitated through one or more communication subsystems 424. Communication subsystem(s) 424 may include one or more wireless communication subsystems. Wireless communication subsystems 424 may include radio frequency receivers and transmitters and/or optical (e.g., infrared) receivers and transmitters. Wired communication systems may include a port device, e.g., a Universal Serial Bus (USB) port or some other wired port connection that may be used to establish a wired connection to other computing devices, such as other communication devices, network access devices, a personal computer, a printer, a display screen, or other processing devices capable of receiving or transmitting data.

The specific design and implementation of the communication subsystem 424 may depend on the communication network(s) or medium(s) over which the device is intended to operate. For example, a device may include wireless communication subsystems designed to operate over a global system for mobile communications (GSM) network, a GPRS network, an enhanced data GSM environment (EDGE) network, IEEE802.xx communication networks (e.g., Wi-Fi, Wi-Max, ZigBee™), 3G, 4G, 4G LTE, code division multiple access (CDMA) networks, near field communication (NFC), Wi-Fi Direct and a Bluetooth™ network. Wireless communication subsystems 424 may include hosting protocols such that the device may be configured as a base station for other wireless devices. As another example, the communication subsystems may allow the device to synchronize with a host device using one or more protocols or communication technologies, such as, for example, TCP/IP protocol, HTTP protocol, UDP protocol, ICMP protocol, POP protocol, FTP protocol, IMAP protocol, DCOM protocol, DDE protocol, SOAP protocol, HTTP Live Streaming, MPEG Dash and any other known communication protocol or technology.

Audio subsystem 426 may be coupled to a speaker 428 and one or more microphones 430 to facilitate voice-enabled functions, such as voice recognition, voice replication, digital recording, telephony functions and for receiving sound signals from an accessory device, as described in reference to FIGS. 1-3.

I/O subsystem 440 may include touch controller 442 and/or another input controller(s) 444. Touch controller 442 may be coupled to a touch surface 446. Touch surface 446 and touch controller 442 may, for example, detect contact and movement or break thereof using any of a number of touch sensitivity technologies, including but not limited to, capacitive, resistive, infrared, and surface acoustic wave technologies, as well as other proximity sensor arrays or other elements for determining one or more points of contact with touch surface 446. In one implementation, touch surface 446 may display virtual or soft buttons and a virtual keyboard, which may be used as an input/output device by the user.

Other input controller(s) 444 may be coupled to other input/control devices 448, such as one or more buttons, rocker switches, thumb-wheel, infrared port, USB port, and/or a pointer device such as a stylus. The one or more buttons (not shown) may include an up/down button for volume control of speaker 428 and/or microphone 430.

In some implementations, device 400 may present recorded audio and/or video files, such as MP3, AAC, and MPEG video files. In some implementations, device 400 may include the functionality of an MP3 player and may include a pin connector for tethering to other devices. Other input/output and control devices may be used. In an embodiment, device 400 may include an audio processing unit for streaming audio to an accessory device over a direct or indirect communication link, as described in reference to FIGS. 1-3.

Memory interface 402 may be coupled to memory 450. Memory 450 may include high-speed random access memory or non-volatile memory, such as one or more magnetic disk storage devices, one or more optical storage devices, or flash memory (e.g., NAND, NOR). Memory 450 may store operating system 452, such as Darwin, RTXC, LINUX, UNIX, OS X, iOS, WINDOWS, or an embedded operating system such as VxWorks. Operating system 452 may include instructions for handling basic system services and for performing hardware dependent tasks. In some implementations, operating system 452 may include a kernel (e.g., UNIX kernel).

Memory 450 may also store communication instructions 454 to facilitate communicating with one or more additional devices, one or more computers or servers, including peer-to-peer communications with wireless accessory devices, as described in reference to FIGS. 1-3. Communication instructions 454 may also be used to select an operational mode or communication medium for use by the device, based on a geographic location (obtained by the GPS/Navigation instructions 468) of the device.

Memory 450 may include graphical user interface instructions 456 to facilitate graphic user interface processing, including a touch model for interpreting touch inputs and gestures; sensor processing instructions 458 to facilitate sensor-related processing and functions; phone instructions 460 to facilitate phone-related processes and functions; electronic messaging instructions 462 to facilitate electronic-messaging related processes and functions; web browsing instructions 464 to facilitate web browsing-related processes and functions; media processing instructions 466 to facilitate media processing-related processes and functions; GPS/Navigation instructions 468 to facilitate GPS and navigation-related processes; camera instructions 470 to facilitate camera-related processes and functions; and fused app instructions with AAA code 472, as described in reference to FIGS. 1-3. The GPS/Navigation instructions 468 include instructions for estimating location, including but not limited to an extended Kalman filter and other processes for estimating location.

Each of the above identified instructions and apps may correspond to a set of instructions for performing one or more functions described above. These instructions need not be implemented as separate software programs, procedures, or modules. Memory 450 may include additional instructions or fewer instructions. Furthermore, various functions of the device may be implemented in hardware and/or in software, including in one or more signal processing and/or app specific integrated circuits (ASICs).

The features described may be implemented in digital electronic circuitry or in computer hardware, firmware, software, or in combinations of them. The features may be implemented in a computer program product tangibly embodied in an information carrier, e.g., in a machine-readable storage device, for execution by a programmable processor; and method steps may be performed by a programmable processor executing a program of instructions to perform functions of the described implementations by operating on input data and generating output.

The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language (e.g., Objective-C, Java), including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random-access memory or both. The essential elements of a computer are a processor for executing instructions and one or more memories for storing instructions and data. Generally, a computer may communicate with mass storage devices for storing data files. These mass storage devices may include magnetic disks, such as internal hard disks and removable disks; magneto-optical disks; and optical disks. Storage devices suitable for tangibly embodying computer program instructions and data include all forms of non-volatile memory, including by way of example, semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, ASICs (app-specific integrated circuits). To provide for interaction with a user the features may be implemented on a computer having a display device such as a CRT (cathode ray tube), LED (light emitting diode) or LCD (liquid crystal display) display or monitor for displaying information to the author, a keyboard and a pointing device, such as a mouse or a trackball by which the author may provide input to the computer.

One or more features or steps of the disclosed embodiments may be implemented using an App Programming Interface (API). An API may define on or more parameters that are passed between a calling app and other software code (e.g., an operating system, library routine, function) that provides a service, that provides data, or that performs an operation or a computation. The API may be implemented as one or more calls in program code that send or receive one or more parameters through a parameter list or other structure based on a call convention defined in an API specification document. A parameter may be a constant, a key, a data structure, an object, an object class, a variable, a data type, a pointer, an array, a list, or another call. API calls and parameters may be implemented in any programming language. The programming language may define the vocabulary and calling convention that a programmer will employ to access functions supporting the API. In some implementations, an API call may report to an app the capabilities of a device running the app, such as input capability, output capability, processing capability, power capability, communications capability, etc.

A number of implementations have been described. Nevertheless, it will be understood that various modifications may be made. Elements of one or more implementations may be combined, deleted, modified, or supplemented to form further implementations. In yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method comprising:
   sending, by a mobile application operating on a mobile device, a request to an online service provider for access to a resource;
   receiving, by the mobile application, a redirect from the online service provider to an identity (ID) service provider for authentication; and
   establishing, by a portion of binary code of the mobile application and using the redirect, a brokered authentication session with the ID service provider, the portion of binary code configured to operate as a broker for the mobile application for the authentication session, wherein after the authenticated session is established for the mobile application, the portion of binary code allows sharing of transaction data with other mobile applications running concurrently on the mobile device by accessing a shared memory location on the mobile device that is accessible by the mobile application and the other mobile applications and that stores transaction data from the mobile application and other mobile applications, and wherein each of the other mobile applications that has established an authenticated session in a same domain as the mobile application has access to encrypted and unencrypted transaction data stored in the shared memory location, and each of the other mobile applications that has established an authenticated session in a different domain as the mobile application has access only to encrypted transaction data stored in the shared memory location.

2. The method of claim 1, wherein the portion of binary code further provides single sign-on (SSO) services to the mobile application and to one or more other mobile applications operating on the mobile device.

3. The method of claim 1, wherein the SSO services include at least one of a service to access the resources or a service for authorization to use the accessed resources.

4. The method of claim 1, further comprising:
   receiving, by the portion of binary code, a cookie from the ID service provider; and
   encrypting, by the portion of binary code, the cookie; and
   storing, by the portion of binary code, the encrypted cookie in a shared memory location.

5. The method of claim 4, wherein the shared memory location is external to the mobile device.

6. The method of claim 1, wherein the mobile application and at least one other mobile application operating on the mobile device communicate with each other and share information.

7. The method of claim 1, wherein the shared information includes cookies provided by the ID service provider.

8. The method of claim 1, wherein the portion of binary code is fused to binary code of the mobile application.

9. The method of claim 1, wherein the portion of the binary code is manually added to the binary code of the mobile application.

10. The method of claim 1, wherein the portion of binary code operates as a direct broker in the brokered authentication session.

11. The method of claim 1, wherein the portion of binary code operates as a forward broker in the brokered authentication session.

12. The method of claim 1, wherein the redirect includes a Uniform Resource Locator (URL).

13. The method of claim 1, wherein the redirect is a response code indicating an authentication scheme and one or more requirements.

14. A mobile device comprising:
one or more processors;
one or more non-transitory storage media storing instructions which, when executed by the one or more computer processors, cause performance of operations comprising:
sending, by a mobile application operating on the mobile device, a request to an online service provider for access to a resource;
receiving, by the mobile application, a redirect from the online service provider to an identity (ID) service provider for authentication; and
establishing, by a portion of binary code of the mobile application and using the redirect, a brokered authentication session with the ID service provider, the portion of binary code configured to operate as a broker for the mobile application for the authentication session, wherein after the authenticated session is established for the mobile application, the portion of binary code allows sharing of transaction data with other mobile applications running concurrently on the mobile device by accessing a shared memory location on the mobile device that is accessible by the mobile application and the other mobile applications and that stores transaction data from the mobile application and other mobile applications, and wherein each of the other mobile applications that has established an authenticated session in a same domain as the mobile application has access to encrypted and unencrypted transaction data stored in the shared memory location, and each of the other mobile applications that has established an authenticated session in a different domain as the mobile application has access only to encrypted transaction data stored in the shared memory location.

15. The mobile device of claim 14, wherein the portion of binary code further provides single sign-on (SSO) services to the mobile application and to one or more other mobile applications operating on the mobile device.

16. The mobile device of claim 14, wherein the SSO services include at least one of a service to access the resources or a service for authorization to use the accessed resources.

17. The mobile device of claim 14, further comprising:
receiving, by the portion of binary code, a cookie from the ID service provider; and
encrypting, by the portion of binary code, the cookie; and
storing, by the portion of binary code, the encrypted cookie in a shared memory location.

18. The mobile device of claim 17, wherein the shared memory location is external to the mobile device.

19. The mobile device of claim 14, wherein the mobile application and at least one other mobile application operating on the mobile device communicate with each other and share information.

20. The mobile device of claim 14, wherein the shared information includes cookies provided by the ID service provider.

21. The mobile device of claim 14, wherein the portion of binary code is fused to binary code of the mobile application.

22. The mobile device of claim 14, wherein the portion of the binary code is manually added to the binary code of the mobile application.

23. The mobile device of claim 14, wherein the portion of binary code operates as a direct broker in the brokered authentication session.

24. The mobile device of claim 14, wherein the portion of binary code operates as a forward broker in the brokered authentication session.

25. The mobile device of claim 14, wherein the redirect includes a Uniform Resource Locator (URL).

26. The mobile device of claim 14, wherein the redirect is a response code indicating an authentication scheme and one or more requirements.

27. One or more non-transitory storage media storing instructions which, when executed by one or more computing devices, cause performance of the method recited in claim 1.

* * * * *